Feb. 14, 1956
G. F. JONES
2,734,468
FERTILIZER TOOL
Filed May 2, 1952
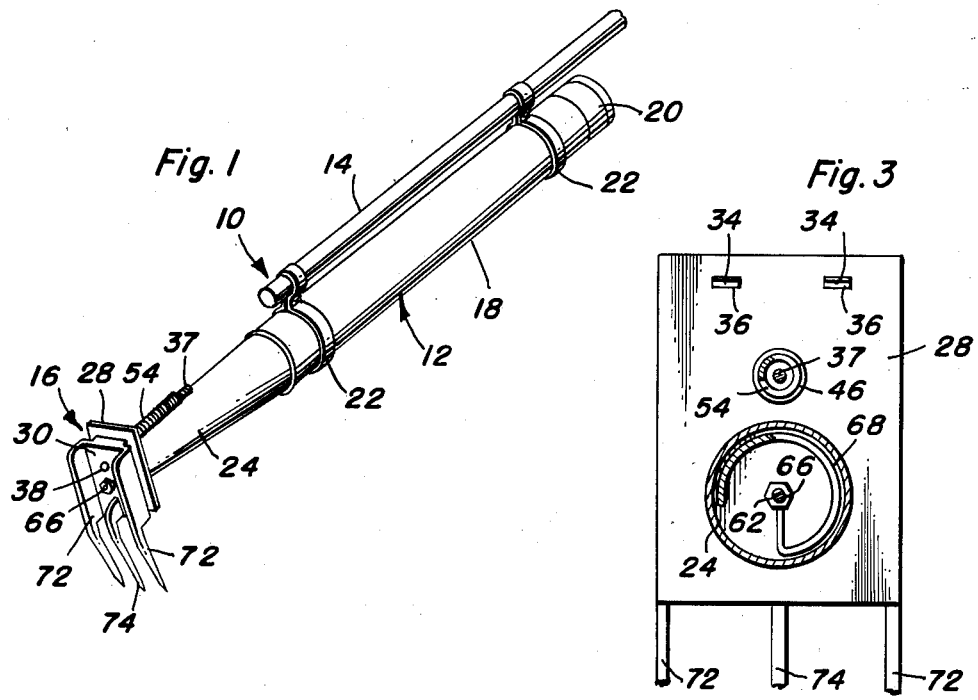
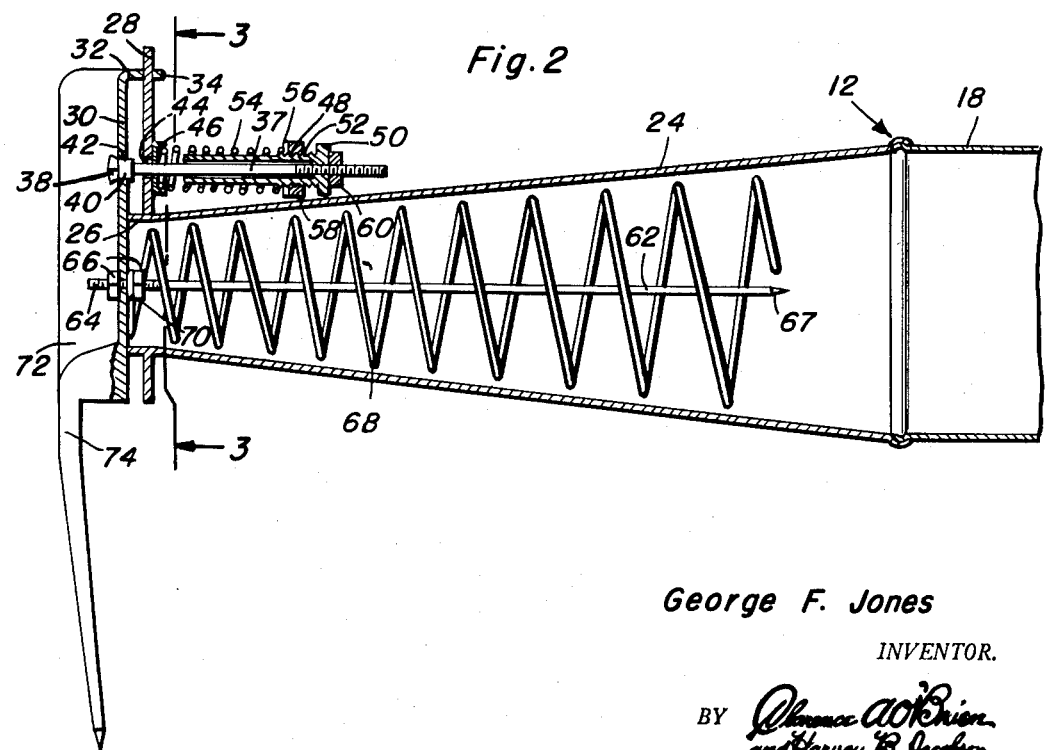
George F. Jones
INVENTOR.

United States Patent Office 2,734,468
Patented Feb. 14, 1956

2,734,468

FERTILIZER TOOL

George F. Jones, Rome, N. Y.

Application May 2, 1952, Serial No. 285,725

3 Claims. (Cl. 111—95)

This invention relates in general to garden tools, and more particularly to tools for distributing fertilizer.

The primary object of this invention is to provide an improved garden tool which is adapted to distributed fertilizer during a soil working operation.

Another object of this invention is to provide an improved garden tool including a fertilizer supply cylinder having a discharge opening at the forward end thereof, said discharge opening being normally closed by a tine plate having a plurality of tines extending downwardly therefrom, said tine plate adapted for movement away from the discharge opening in response to movement of the tines during a ground engaging operation.

Another object of this invention is to provide an improved garden tool comprising a fertilizer supply cylinder having a discharge opening at the forward end thereof, a base plate mounted on said fertilizer supply cylinder adjacent the discharge opening, a tine plate hingedly secured to the base plate and adapted to close said discharge opening, said tine plate being urged into a discharge opening closing position by a spring means carried by said base plate and operatively connected to the tine plate.

Another object of this invention is to provide an improved fertilizer tool which includes a fertilizer supply cylinder having a discharge opening controlled by movement of tines mounted upon a tine plate during a ground working operation, said tine plate being provided with agitator means disposed within said fertilizer supply cylinder for urging fertilizer disposed therein toward said discharge opening.

A further object of this invention is to provide an improved fertilizer tool which is of extremely simple construction and will apply a limited amount of fertilizer to only that area which is being cultivated.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 1 is a perspective view of the lower end of the fertilizer tool, which is the subject of this invention, the lower portion of the handle for the fertilizer tool being illustrated as clamped to the fertilizer supply cylinder of the fertilizer tool;

Figure 2 is an enlarged longitudinal transverse vertical sectional view of the forward end of the fertilizer tool of Figure 1 and showing the general construction of the means for controlling the flow of fertilizer out of a discharge opening at the forward end thereof; and, Figure 3 is a transverse vertical sectional view, taken substantially upon the plane indicated by the section line 3—3 of Figure 2 and showing the general construction of the base plate secured to the forward end of the fertilizer supply cylinder.

Similar characters of reference designate similar or identical elements and portions throughout the specification and throughout the different views of the drawings.

Referring now to the accompanying drawings in detail, it will be seen that there is illustrated in Figure 1 the fertilizer tool, which is the subject of this invention, the fertilizer tool being referred to in general by the reference character 10. The fertilizer tool 10 includes a fertilizer supply cylinder 12 which is clamped on the lower end of a handle 14 and has a discharge control means 16 at the forward end thereof for controlling the discharge of fertilizer therefrom. It will be noted that the fertilizer supply cylinder 12 includes a cylindrical rear portion 18 which may be considered the main portion of the fertilizer supply cylinder and has secured to the upper end thereof a removable filler cap 20. Carried by the cylindrical portion 18 is a pair of longitudinally spaced clamps 22 which have portions receiving and clamping the handle 14 thereby the fertilizer supply cylinder 12 is rigidly secured to the handle 14.

Disposed at the forward end of the cylindrical portion 18 is a truncated conical portion 24 which is hollow and communicates with the interior of the cylindrical portion 18. While the conical portion 24 has been illustrated in Figure 2 as being separate from and secured to the cylindrical portion 18, it will be understood that if it is so desired it may be made integral therewith.

In order that fertilizer (not shown) disposed within the fertilizer supply cylinder 12 may be conveniently discharged therefrom, the conical portion 24 is provided with a circular discharge opening 26 at the forward end thereof. Carried by the forward end of the conical portion 24 adjacent the discharge opening 26 is a generally rectangular base plate 28 which has a major portion thereof extending upwardly above the conical portion 24. Pivotally secured to the base plate 28 is a tine plate 30 which has a rearwardly extending upper portion 32. The rearwardly extending upper portion 32 is provided with a pair of transversely spaced rectangular fingers 34 which are pivotally received in similar rectangular openings 36 in the upper portion of the base plate 28. It will be noted that the upper portion 32 is of a width substantially equal to the distance which the base plate is offset rearwardly of the discharge opening 26 whereby the tine plate 30 may be in spaced parallel relation to the base plate 28 and at the same time engage the peripheral edges of the discharge opening 26 and close same.

In order that the tine plate 30 may normally close the discharge opening 26, it is provided with an elongated bolt 37 which is provided with a head 38 having a tapered underside which engages the forward surface of the same. Carried by the bolt 37 adjacent the head 38 is an enlarged shoulder portion 40 which is received in a similar shape opening 42 in the tine plate 30. The bolt 37 extends rearwardly through an enlarged opening 44 in the base plate 28, the opening 44 being substantially aligned with the opening 42. Secured to the rear side of the base plate 28 in alignment with the opening 44 is a cup-shaped member 46. Threaded on the rear portion of the bolt 37 is an internally threaded sleeve member 48 which is provided at its rear end with a head 50 and external threads 52 adjacent the head 50.

Carried by the sleeve member 48 is a coil spring 54 whose forward end engages in the cup-shaped member 46 and whose rear end engages a washer 56 which is urged toward the cup-shaped member 46 by a nut 58 threadedly engaged on the threaded portion 52 of the sleeve member 48. Movement of the sleeve member 48 on the bolt 37 is prevented by a lock nut 60 threaded upon the threaded rear end of the bolt and jammed against the rear end of the sleeve member 48.

It will be noted that the tine plate 30 being hinged at its upper end to the base plate 28, will be pulled against the outer peripheral edge of the discharge opening due to the tension of the bolt 37 exerted by the spring 26. The tension exerted by the spring 54 may be controlled by adjusting the nut 58 or the sleeve member 48. The sleeve 48 is adjusted with respect to the base plate 28 in order to limit the opening movement of tine plate 30 by the striking the rear of the base plate 28.

In order that fertilizer disposed within the fertilizer supply cylinder 12 may be agitated toward the discharge opening 26, the tine plate 30 is provided with an elongated agitator rod 62 which is provided with threads 64 at the forward end thereof. The agitator rod 62 has a pair of nuts 66 threadedly engaged thereon and is disposed on opposite sides of the tine plate 30 in order to secure the agitator rod thereto. The rear end of the agitator rod 62 is provided with a sharp point 67 for digging into the fertilizer.

Secured to the rear of the tine plate 30 by the agitator rod 62 is a second agitator element in the form of a spiral spring 68 whose forward end is bent in the form of an eye 70 of a small diameter. The eye 70 is received over the threaded end of the agitator rod 62 and clamped against the rear of the tine plate 30 by the rearmost of the nuts 66. It will be noted that the taper of the spiral spring 68 is substantially the same as that of the conical portion 24.

In order that ground may be worked with the fertilizer tool 10, the tine plate 30 is provided along its outer edges with a pair of tines 72 which extend the full height of the tine plate and reinforces the same. Connected to the lower portion of the tine plate 30 intermediate the outer tines 72 is a central tine 74. It will be noted that the lower ends to the tines 72 and 74 are in alignment and are sharp to form ground engaging elements.

When the ground around a plant is being worked, the tines 72 and 74 are dug into the ground and the tool pulled rearwardly with the result that the tine plate 30 pivots about its upper end when sufficient pressure has been applied to overcome the resistance of the spring 54 whereby the tine plate 30 moves away from the discharge opening 26 and fertilizer is discharged from the fertilizer cylinder 12. When the pressure upon the tines 72 and 74 is released, the spring 54 once again urges the tine plate 30 to a rearward position and results in the closing of the discharge opening 26. The action of the agitator rod 62 and the spirial spring 68 causes movement of the fertilizer toward the discharge opening 26 whereby fertilizer is discharged each time the discharge opening 26 is opened.

While the two tines 72 have been illustrated as extending the full height of the tine plate 30, it will be understood that the tine 72, if desired, may be of the same shape as the central tine 74.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined by the appended claims.

Having described the invention, what is claimed as new is:

1. A fertilizer tool comprising a fertilizer supply cylinder having a discharge opening at the forward end thereof, a tine plate mounted at the forward end of said fertilizer supply cylinder, ground working tines carried by said tine plate, means resiliently urging said tine plate into engagement with edges of said discharge opening for closing the same, said tine plate being provided with an agitator disposed within said fertilizer supply cylinder and extending through the discharge opening for urging fertilizer toward the same, said agitator including a spiral spring having its forward end secured to the tine plate and an elongated agitator rod extending through the center of the spiral spring.

2. A fertilizer tool comprising a fertilizer supply cylinder having a discharge opening at the forward end thereof, a closure forming tine plate pivotally mounted at the forward end of said fertilizer supply cylinder, ground working tines carried by said tine plate, means resiliently urging said tine plate into engagement with edges of said discharge opening for closing the same, said fertilizer tool being manipulated by a handle clamped to said fertilizer supply cylinder, said means including an elongated fastener carried by the tine plate and extending through a base plate on the cylinder, a spring carried by said fastener and abutting the rear of said base plate, an elongated sleeve adjustably secured on said fastener for limiting the movement thereof and said tine plate with respect to said base plate, an adjustable shoulder element on said sleeve engaging the other end of the spring for varying the pressure thereof.

3. For use in a fertilizer tool of the type including an open end container and a tine plate resiliently closing the open end, the improvement comprising agitator means, said agitator means including a spiral spring having one end thereof secured to the tine plate, and an elongated agitator rod secured to the tine plate and extending through the center of said sprial spring.

References Cited in the file of this patent

UNITED STATES PATENTS

| | | |
|---|---|---|
| 158,129 | Robinson | Dec. 22, 1874 |
| 406,137 | Holeman | July 2, 1889 |
| 906,446 | Moore | Dec. 8, 1908 |
| 963,214 | Dunwoodie et al. | July 5, 1910 |
| 1,059,169 | Kohn | Apr. 15, 1913 |
| 1,071,408 | Evans | Aug. 26, 1913 |
| 1,394,288 | Dossett | Oct. 18, 1921 |
| 1,413,132 | Printz | Apr. 18, 1922 |
| 1,489,092 | Marston | Apr. 1, 1924 |
| 1,659,772 | Hanson | Feb. 21, 1928 |
| 1,689,866 | Erickson | Oct. 30, 1928 |
| 1,998,373 | Love | Apr. 16, 1935 |
| 2,014,003 | McRae | Sept. 10, 1935 |
| 2,109,385 | Garrison et al. | Feb. 22, 1938 |
| 2,236,129 | Baker | Mar. 25, 1941 |
| 2,355,732 | Jepsen | Aug. 15, 1944 |
| 2,507,738 | Spatz | May 16, 1950 |

FOREIGN PATENTS

| | | |
|---|---|---|
| 13,705 | Great Britain | July 31, 1897 |
| 321,857 | Great Britain | Nov. 21, 1929 |
| 30,677 | Austria | Nov. 25, 1907 |
| 204,675 | Germany | Dec. 2, 1908 |